L. A. CRAIN.
TRAP.
APPLICATION FILED AUG. 13, 1912.
1,052,320.
Patented Feb. 4, 1913.
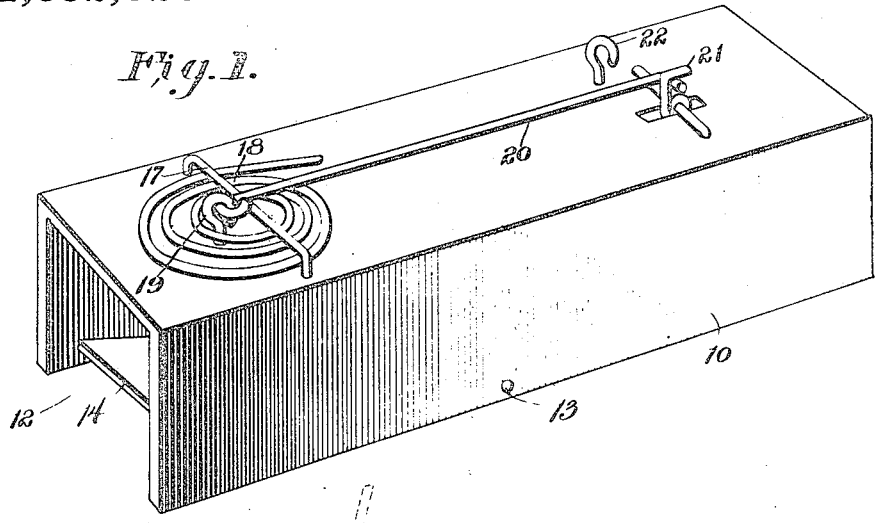
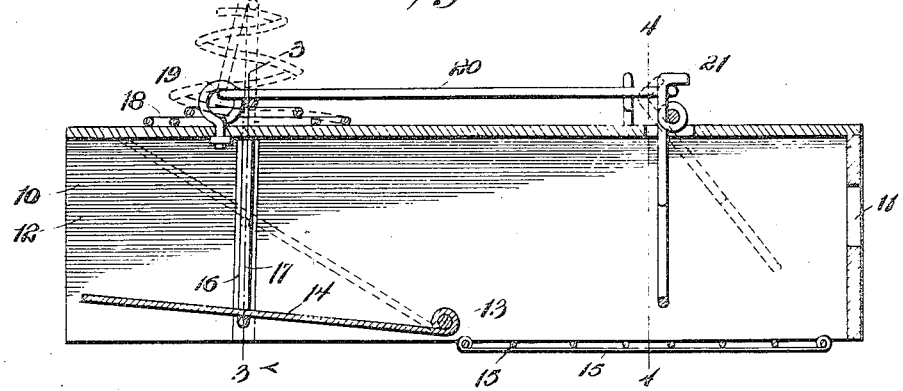
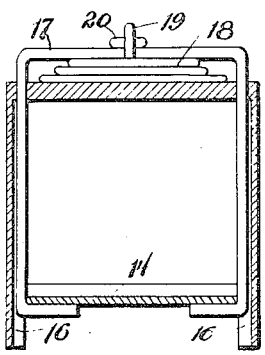
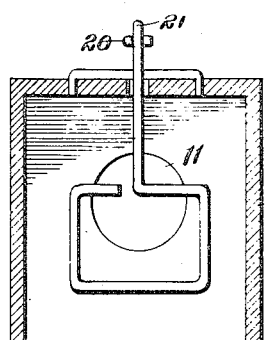
Witnesses
Inventor
L. A. Crain.
By Victor J. Evans
Attorney

UNITED STATES PATENT OFFICE.

LESTER A. CRAIN, OF WEBSTER, SOUTH DAKOTA.

TRAP.

1,052,320. Specification of Letters Patent. Patented Feb. 4, 1913.

Application filed August 13, 1912. Serial No. 714,890.

*To all whom it may concern:*

Be it known that I, LESTER A. CRAIN, a citizen of the United States, residing at Webster, in the county of Day and State of South Dakota, have invented new and useful Improvements in Traps, of which the following is a specification.

An object of the invention is to provide a trap for catching gophers and other ground burrowing animals.

The invention embodies, among other features, a casing having an open end which is placed adjacent to the gopher hole or arranged to cover the hole, suitable spring-actuated means being provided which, when released, will close the open end of the casing, thus trapping the gopher therein.

In the further disclosure of the invention reference is to be had to the accompanying drawings, constituting a part of this specification, in which similar characters of reference denote corresponding parts in all the views, and in which:

Figure 1 is a perspective view of the device, showing the trap set; Fig. 2 is a vertical longitudinal sectional view, the trap being shown set in full lines and in final or closed position in dotted lines; Fig. 3 is a vertical transverse sectional view taken on the line 3—3 in Fig. 1; and Fig. 4 is a vertical transverse sectional view taken on the line 4—4 in Fig. 1.

Referring more particularly to the views, use is made of a casing 10 having an opening 11 formed in the rear end thereof, the front end 12 of the casing being open and adapted to cover the gopher hole when the casing is mounted in position to catch the animal. A rod 13 is arranged to extend transversely through the casing adjacent the lower edges thereof and adjacent the front end, and mounted to swing thereon is a closure 14 which, when in open or set position, forms a portion of the bottom of the casing, the remainder of the bottom of the casing being formed by stretching wires 15 longitudinally and transversely across the lower edges of the sides of the casing, as shown. Guideways 16 are formed on the inner faces of the sides of the casing, and mounted to slide therein is a U-shaped stirrup 17 having the lower extremities thereof bent laterally inward to engage the under side of the closure 14 at a distance from the point of pivotal connection of the closure with the casing 10.

Mounted on the upper side of the top of the casing 10 is an expansible spring 18 interposed between the upper face of the casing and the cross bar of the U-shaped stirrup 17 when the trap is in set position, an eyelet 19 being secured in the top side of the casing 10 and having pivotally connected thereto a bar 20, the free end of which is bent laterally for removable connection with a trigger 21 mounted to swing adjacent the rear end of the casing, the lower end of the trigger being arranged to depend within the casing and bent in a rectangular form as shown, so that when the gopher passes into the casing and moves toward the opening 11 therein it will be necessary for the gopher to engage the trigger 21 in order to reach the opening 11, it being understood that animals such as gophers naturally endeavor to reach openings in the mounds that they form for the purpose of closing the same. A retaining member 22, preferably consisting of an eyelet or the like is screwed into the upper side of the casing adjacent the trigger 21 for the purpose of securing the bar 20 in inoperative position when it is not desired to use the trap.

In the use of the trap, the casing 10 is placed on the ground with the open end thereof covering the hole previously made in the mound of the gopher. By pressing downwardly on the U-shaped stirrup 17 and against the action of the spring 18, the lower ends of the stirrup will move to a position adjacent the bottom of the casing, thus causing the closure 14 to gravitationally fall into horizontal position, the laterally bent ends of the stirrup being arranged to engage the under side of the closure, as mentioned heretofore. The bar 20 is now arranged to pass over the U-shaped stirrup 17 and the free end of the bar is engaged with the trigger 21, it being thus seen that the bar when arranged as shown will retain the stirrup 17 in lowered position and hold the same against the expansible action of the spring 18. Now when the gopher passes into the casing through the open front end thereof and endeavors to reach the opening 11, the gopher will engage the depending end of the trigger 21, thus actuating the same sufficiently to disengage the bar 20 therefrom and at the moment the bar is released, the action of the spring 18 will move the stirrup member upwardly, thus carrying the closure 14 to closed position to close the front end of the casing, the gopher being thus locked or trapped within the casing.

As shown in dotted lines in Fig. 1, when it is not desired to use the trap, the free end of the bar 20 can be engaged with the retaining member 22, thus preventing the trap from operating, while at the same time the closure 14 will be in set position, it being simply necessary to disengage the bar 20 from the retaining member 22 and move the same a slight distance to one side and into engagement with the trigger 21 in order to place the trap in set position.

Having thus described my invention, I claim:

In a trap, the combination with a casing, of a closure therefor, guideways formed on the said casing, a U-shaped stirrup member mounted to slide on the said guideways and engaging the said closure, a spring engaging the said stirrup to move the same upwardly and swing the said closure into closed position, a trigger mounted on the said casing, and a bar mounted to swing on the casing and extending across the said stirrup to engage the said trigger and retain the stirrup in lowered or set position.

In testimony whereof I affix my signature in presence of two witnesses.

LESTER A. CRAIN.

Witnesses:
 ANDREA B. GABY,
 GEO. C. DUNTON.